United States Patent [19]

Schosek et al.

[11] Patent Number: 4,903,406
[45] Date of Patent: Feb. 27, 1990

[54] PIPE SPLITTER

[76] Inventors: William O. Schosek, 1748 Coral Way NW., North Ft. Myers, Fla. 33917; Neil Schosek, 14041 Hall Rd., #805, North Ft. Myers, Fla. 33903; Michael Janiga, 126 Kalla La. East, Aurora, N.Y. 14052

[21] Appl. No.: 132,424

[22] Filed: Dec. 14, 1987

[51] Int. Cl.⁴ .................. B23D 21/06; B26B 27/00; E21B 29/06; E02D 29/10
[52] U.S. Cl. ............................. 30/92.5; 30/103; 166/55.2; 405/156
[58] Field of Search ............ 30/92.5, 103; 138/97; 166/55.2; 405/154, 156

[56] References Cited

U.S. PATENT DOCUMENTS

| | | | |
|---|---|---|---|
| 1,001,205 | 8/1911 | Lovell | 166/55.2 |
| 2,983,042 | 5/1961 | Frantz et al. | 30/92.5 |
| 3,181,302 | 5/1965 | Lindsay | 405/156 |
| 4,106,561 | 8/1978 | Jerome et al. | 30/103 X |
| 4,318,639 | 3/1982 | Schosek | 405/184 |

Primary Examiner—Douglas D. Watts
Assistant Examiner—Paul M. Heyrana, Sr.
Attorney, Agent, or Firm—Frijouf, Rust & Pyle

[57] ABSTRACT

A pipe splitter having an elongated frame, a first end and a second end is disclosed. A first roller and a second roller is rotatably positioned proximate the first end and the second end of the elongated frame, respectively, to rotatably support the elongated frame when positioned in use into the bore of a pipe to be split. A first coupling means is securably positioned at the first end of the elongated frame to enable the elongated frame to be pulled along a longitudinal dimension of the pipe to be split. A cutting wheel is positioned between the first end and the second end of the elongated frame to enable a cutting engagement of the pipe in order to split the pipe along a single longitudinal path thereof.

20 Claims, 2 Drawing Sheets

PIPE SPLITTER

BACKGROUND OF THE INVENTION

1. Field of the Invention

This invention relates to a pipe splitting device and more specifically to a device which splits a buried pipe along a longitudinal path of the pipe to be split while simultaneously positioning a replacement pipe therefor.

2. Description of Related Art

In an effort to replace buried pipe which has lost its use because of age or size, it becomes necessary to unearth the old pipe and replace it install new piping within the old pipe or break-up the old pipe and replace it with a new pipe. Installing new piping within the old pipe means that the bore of the replacement pipe is less than the old pipe through which the new piping is threaded. Recently, a method and apparatus for replacing buried pipe with the same or larger dimension and the existing pipe has been described in U.S. Pat. No. 4,507,019. The apparatus employes a mandrel with a plurality of hard metal boring buttons such as tungsten carbide to score the internal surface of the existing pipe. The buttons are positioned on a pipe expansion section which causes the existing pipe to break apart when forced through the existing pipe. A replacement pipe is simultaneously positioned during the passage of the mandrel through the existing pipe. The mandrel is pushed through the existing pipe with a jacking machine having a thrust force of about 160,000 to 300,000 lbs. A winch may add an additional pulling force of about 5,000 lbs.

A self-propelled apparatus is taught in U.S. Pat. No. 4,674,914 for replacing gas mains. This device is hydraulically operated, slides within the existing pipe, grips the internal surface of the existing pipe and utilizes a vibratory means to breakup the existing pipe. The device tows a replacement pipe.

The prior art fails to teach a pipe splitting device which is pulled through an existing pipe with a single cutter wheel for splitting the existing pipe along a longitudinal path of the existing pipe while simultaneously replacing the existing pipe with a new replacement pipe.

An object of the invention is to provide a pipe splitting device with an elongate frame which may be used in splitting different diameter pipes along a longitudinal path of the pipe to be split.

Another object of the invention is to provide a pipe splitting device with an elongate frame which accepts a different sized cutting wheel and different sized rollers and different sized side wheels to enable the cutting of different size bores by interchanging a different sized cutting wheel, rollers and side rollers.

Another object of the invention is to provide a pipe splitting device with an elongate frame which does not provide a wearing surface thereon thereby lessening the frequency of replacement of the elongate frame.

Another object of the invention is to provide a pipe splitting device which is maneuverable around bends in the existing pipe.

Another object of the invention is to provide a pipe splitting device which enables the replacement pipe to be larger than the existing pipe it replaces.

Another object of the invention is to provide a pipe splitting device which forms a single longitudinal cut along a longitudinal path of the pipe to be split.

Another object of the invention is to provide a pipe splitting device which may be moved longitudinally within a length of pipe to effect slitting of the pipe from within the bore of the pipe.

Another object of the invention is to provide a pipe splitting device which may be orientated within the pipe to be split such that the lower portion of the pipe to be split is cut by the cutting wheel thereby enabling an expander to spread the pipe cut to provide a cap over the newly positioned replacement pipe simultaneously positioned during the splitting process.

Another object of the invention is to provide a pipe splitting device which requires less pipe splitting force than conventional internal pipe splitting devices.

The foregoing has outlined some of the more pertinent objects of the present invention. These objects should be construed to be merely illustrative of some of the more pertinent features and applications of the invention. Many other beneficial results can be obtained by applying the disclosed invention is a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

This invention is defined by the appended claims with a specific embodiment shown in the attached drawings. For the purpose of summarizing the invention, the invention may be incorporated into a pipe splitting apparatus comprising an elongated frame having a first end and a second end. A first roller and a second roller are rotatably positioned proximate the first end and the second end of the elongated frame, respectively, to rotatably support the elongated frame along a first longitudinal path of a pipe to be split when positioned into the bore of the pipe to be split. A first coupling means is securably positioned at the first end of the elongated frame to enable the elongated frame to be pulled along a longitudinal dimension of the pipe by an installer device. A cutting wheel is positioned between the first end and the second end of the elongated frame such that the first and second rollers supportingly engage an internal surface of the pipe to be split and the cutting wheel cuttably engages the thickness of the pipe wall along a second longitudinal path of the pipe to be split thereby splitting the pipe along the second longitudinal path thereof which is opposite the first longitudinal path traveled by the first and second rollers.

The pipe splitter may further include a second coupling means positioned at the second end of the elongated frame to enable the coupling of a replacement pipe or of a connector fitting securing a replacement pipe such that the replacement pipe follows the elongated frame being pulled along the longitudinal dimension of the pipe being split. Connector fittings for the installation of underground plastic pipes by pulling the fitting which is secured to the plastic pipe are known. U.S. Pat. No. 4,318,639 which is incorporated herein by reference as if fully set forth herein, and issued to William O. Schosek, one of the applicants herein teaches such a connector fitting. The second coupling may further include a spreader attached to it to open up the pipe split by the cutting wheel followed by the connector fitting. Generally, the spreader and/or connector fitting is at least about 1.5 to 2 feet behind the elongated frame. In the event the spreader and/or connector fitting is too close to the elongated frame, the amount of power to pull the devices along the longitudinal axis of the pipe to be split greatly increases. Such spreaders are known in the underground pipe installing art where they are used for spreading the ground to provide an opening for installation of an underground pipe or cable between two specific spaced apart points.

In use, the device does not rotate, or only to a slight extent if at all, within the bore of the pipe to be split. Thus, the device may be positioned or orientated within the pipe to be split such that the lower portion, i.e. that part of the pipe furthest away from the surface of the ground, of the pipe to be split is cut by the cutting wheel. Cutting the lower portion of the pipe to be split enables an expander to spread the pipe cut to provide a cap over the newly positioned replacement pipe simultaneously positioned during the splitting process.

Preferably, the cutting wheel has a circular dimension greater than the bore of the pipe to be split. The first and the second rollers are preferably positioned on the elongated frame and dimensioned such that the rotating cutting wheel engages and splits the pipe along a longitudinal path of the pipe while the first and second rollers rotatably engage the inner surface of the pipe along a longitudinal path directly opposite the path of cutting wheel. This configuration enables the cutting wheel to form a single longitudinal split along a longitudinal path of the pipe and spaces the cutting wheel apart from the pipe being split at a point directly opposite of the cutting engagement of the pipe being split by the cutting wheel. The cutting wheel cuts through thickness of the pipe as the elongate frame is being pulled through the pipe to form a longitudinal split along the pipe.

Preferably, a first and a second aperture is formed in the elongate frame proximate the first end and the second end of the elongate frame, respectively. The first and second apertures receive the first and the second rollers, respectively, which are rotatably positioned therein. With like preference, the cutting wheel is received in a third aperture formed in the elongate frame between the first and the second aperture. The cutting wheel is rotatably positioned in the third aperture.

The first roller and the second roller are preferably positioned in the same common plane in which the longitudinal axis of the elongate frame lies. Most preferably, the first roller, the second roller and the cutting wheel are positioned in the same common plane in which the longitudinal axis of the elongate frame lies. The longitudinal axis of the elongate frame is generally coincident with the longitudinal axis of the pipe. Preferably, the first roller, the second roller and the cutting wheel are equally spaced from the first side and second side of the elongate frame within the elongate frame and in the same common plane.

Preferably, the elongated frame includes a first side and a second side with a first side wheel and a second side wheel positioned at the first side and the second side of the elongated frame, respectively. The first and second side wheels enable the cutting of the pipe including a pipe coupling where the thickness of the piping is about twice as great as the thickness of the pipe alone, without collapsing or elongating the pipe being cut or the pipe coupling being cut. That is, the first and second side wheels prevent the pipe from deforming thereby ensuring a cutting engagement of the pipe by the cutting wheel. Preferably, each of the first and the second side wheels are each positioned proximate the first end of the elongate frame, before the position of the cutting wheel and most preferably at the portion of the elongate frame between the cutting wheel and the first roller.

Preferably, each first and second roller has an arced rim such that in use the arced rim coincides with an arc of the inner periphery, i.e., concave portion, of the interior lengthwise cylindrical cavity of the pipe being split.

Each of the first and second side wheels preferably include an arced rim such that the arced rim coincides with an arc of the inner periphery of the interior lengthwise cylindrical cavity of the pipe being split.

The elongate frame further includes on each side a first opening and a second opening formed in the elongate frame perpendicular to the common plane in which the longitudinal axis of the elongate frame lies. The first and second openings extend through the first side of the elongate frame and the second side of the elongate frame. The first and second openings are positioned proximate the first end and the second end of the elongated frame, respectively, to enable a first axle and a second axle to be securably and supportably received by the first and the second opening in the elongate frame for rotatably supporting the first and the second roller wheels, respectively. Preferably, each of the first and the second roller wheels further include a first and a second axle bore, respectively, for receiving the first axle and the second axle. This permits the roller wheels to rotate relative to the axle by providing a means for preventing the axle rotation of the first and the second axles relative to the elongated frame.

Preferably, the elongate frame further includes a third opening formed therein and positioned between the first end and the second end of the elongate frame. The third opening extends through the first side of the elongate frame and the second side of the elongate frame, as the first and second openings. A third axle is securably and supportably received by the third opening in the elongate frame for rotatably supporting the cutting wheel. Preferably, the cutting wheel further includes an axle bore for receiving the third axle. The first, second and third axles are perpendicular to the longitudinal plane that the elongate frame lies. A means for preventing the axle rotation of the third axle relative to the elongated frame enables the cutting wheel to rotate relative to the third axle.

Preferably, a fourth and a fifth opening is formed in the elongate frame in a plane which is parallel to the longitudinal axis that the elongate frame lies. The fourth and fifth opening securely and supportingly receive a fourth and a fifth axle, respectively. The first side wheel and the second side wheel further include an axle bore for receiving therein the fourth and the fifth axle, respectively. A means for preventing in use the axle rotation of the fourth and the fifth axles relative to the elongated frame enables the side wheels to rotate relative to the fourth and the fifth axles.

However, other modifications could be used to provide a stationary axle to permit rotation about the axle by the cutting wheel or rollers. For example, the elongate frame could include replaceable studs as fixed and non rotatable axles. The purpose of the fixed or stationary axle is to inhibit rotational ware of the openings formed in the elongate frame. Thus, by providing a fixed axle, the axle receives the rotational ware upon rotation of the wheel or roller positioned thereon rather than the elongate frame.

In a further embodiment the pipe splitter comprises an elongated frame having a first end and a second end. A first and a second aperture is formed in the elongate frame proximate the first end and the second end of the elongate frame, respectively. A first roller and a second roller is rotatably positioned in the first and second apertures, respectively, to rotatably support the elongated frame when positioned into the bore of the pipe to be split and being moved along a first longitudinal path of the pipe to be split. A first coupling means is securably positioned at the first end of the elongated frame to enable the elongated frame to be pulled within the pipe along a longitudinal axis thereof. A third aperture is formed in the elongate frame between the first aperture and the second aperture formed in the elongated frame.

A cutting wheel is rotatably positioned in the third aperture such that the first and second rollers supportingly engage the internal surface of the pipe to be split and the cutting wheel cuttably engages the thickness of the pipe wall along a second longitudinal path of the pipe to be split thereby splitting the pipe along the second longitudinal path thereof which is opposite the first longitudinal path traveled by the first and second rollers within the bore of the pipe to be split. The cutting wheel has a circular dimension greater than the bore of the pipe and the first and the second rollers are dimensioned and positioned on the elongated frame such that the cutting wheel engages the pipe to be split and forms a single longitudinal split along the second longitudinal path of the pipe. The elongate frame includes a first side and a second side with each side of the elongated frame having a first opening and a second opening formed therein perpendicular to the common plane in which the longitudinal axis of the elongate frame lies. Each of the first and second openings extend through the first side of the elongate frame and the second side of the elongate frame. The first and the second opening are positioned proximate the first and the second end of the elongated frame, respectively. A first axle and a second axle is securably and supportably received by the first and the second opening in the elongate frame for rotatably supporting in use the first and the second rollers, respectively. The first and the second rollers include a first and a second axle bore, respectively, for receiving the first axle and the second axle therethrough, respectively. A means for preventing in use axle rotation of the first and the second axles relative to the enables the second rollers to rotate relative to the first and the second axles. The elongate frame further includes a third opening formed therein perpendicular to the common plane in which the longitudinal axis of the elongate frame lies and positioned between the first end and the second end of the elongate frame. The third opening extends through the first side of the elongate frame and the second side of the elongate frame. A third axle being supportably received in the third opening in the elongate frame for rotatably supporting the cutting wheel. The cutting wheel further includes an axle bore for receiving the third axle. A means for preventing the axle rotation of the third axle relative to the elongated frame enables the cutting wheel to rotate relative to the third axle. The elongated frame further including a first side and a second side. A first side wheel and a second side wheel is positioned at the first side and the second side of the elongate frame, respectively, proximate the first end of the elongated frame to enhance the cutting of the pipe without collapsing or elongating the pipe. The elongate frame further includes a fourth and a fifth opening for receiving a fourth and a fifth axle. The first side wheel and the second side wheel further include an axle bore for receiving the fourth and the fifth axle, respectively. A means for preventing in use the axle rotation of the fourth and the fifth axles relative to the elongated frame enables the side wheels, to rotate relative to the fourth and the fifth axles such that the side wheels, the rollers and the cutting wheel rotates relative to the elongate thereby confining ware of the pipe splitter to the side wheels, the rollers and the cutting wheel and their respective axles.

Most preferably, the first roller, the second roller and the cutting wheel are positioned in the same common plane in which the longitudinal axis of the elongate frame lies. The longitudinal axis of the elongate frame is generally coincident with the longitudinal axis of the pipe. The elongate frame of the invention is capable of being pulled through piping having a bend of about 20° when the length of the frame is about 24 inches. The pulling power for cutting through a four inch black iron pipe and coupling (about one-half inch thickness of iron) is about 24,000 lbs.

The first and second coupling means include a threaded (internal or external) shaft securely attached to the elongate frame to permit threaded engagement with the device pulling the elongate frame along the pipe to be split or with the connector fitting.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DISCUSSION

Figure 1:
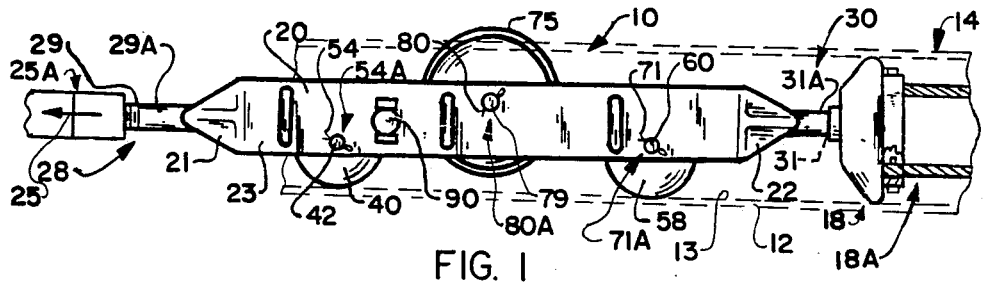
FIG. 1 is a right side view of a pipe splitting apparatus.

FIG. 1 is a side view of the pipe splitter apparatus 10 comprising an elongate frame 20 having a first end 21 and a second end 22. The first end 21 includes a first coupling means 28. Whereas the second end 22 includes a second coupling means 30. In use, a pipe spreader 18 spreads open the pipe cut by the cutting wheel 75 and a replacement pipe puller 18A secures the replacement pipe 14 to elongate frame 20. The pipe spreader 18 is optional and is used where it is desired to further split apart the pipe first split by cutting wheel 75. The replacement pipe puller 18A is secured to second coupling means 30 or as illustrated at FIG. 1 is secured to a pipe spreader 18 which is secured to the second coupling means 30. An installer device (not shown) is secured to the first coupling means 28. Upon activation of the installer device, the pipe splitter 10 is pulled in the direction of arrow 25 within the bore 13 of the pipe to be split 12. The first coupling means 28 and a second coupling means 30 include those coupling structures such as the external threads 29 positioned about shaft 29A or internal threads 31 formed in a hollow shaft 31A. First roller 40 is rotatably positioned proximate the first end 21 of the elongate frame 20. Second roller 58 is rotatably positioned proximate the second end 22 of the elongate frame 20. The cutting wheel 75 is rotatably positioned between the first roller 40 and second roller 58 of the elongate frame 20. Preferably, the first and second rollers 40, 58 and the cutting wheel 75 are positioned in the same common plane in which the longitudinal axis of the elongate frame lies. This positions the first longitudinal path of travel 14A of the first and the second rollers directly opposite the second longitudinal path of travel 15A of the cutting wheel 75. The first roller 40 is rotatably positioned on first axle 42. The first axle 42 is securably positioned at the first side 23 of the elongate frame 20 by a cotter pin 54. The second roller 58 is rotatably positioned on a second axle 60. The second axle 60 is secured to the elongate frame 20 at the first side 23 of the elongate frame 20 by cotter pin 71. The cutting wheel 75 is rotatably positioned on a third axle 79. The third axle 79 is secured to the elongate frame 20 at the first side 23 of the elongate frame 20 by cotter pin 80.

Figure 2:
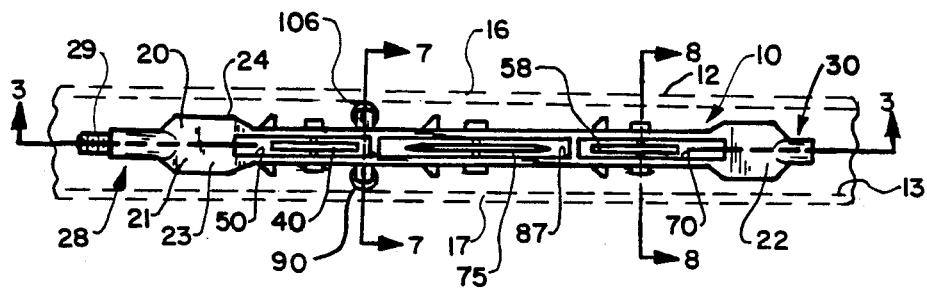
FIG. 2 is a top view of FIG. 1 further illustrating the apparatus within the bore of the pipe to be split.

FIG. 2 is a top view of the splitter 10 of FIG. 1 absent the puller or installer device attachment means 25A secured to the first coupling means 28 and the spreader 18 and replacement pipe coupling 18A secured to the second coupling means 30. FIG. 2 includes an illustration of the pipe to be split 12 in dashed lines. In use the apparatus of the invention 10 is positioned within the bore 13 of the pipe to be split 12. The cutting wheel 75, first roller 40 and second roller 58 lie in a plane perpendicular to the plane of the paper illustrating FIG. 2. The first roller 40 is rotatably positioned within aperture 50 formed in the elongate body 20. The second roller 58 is rotatably positioned within the second aperture 70. The cutting wheel 75 is rotatably positioned in the third aperture 87. The first aperture 50 is positioned proximate the first end 21 of elongate body 20. The first roller 40 is received within first aperture 50 of the elongate frame 20 to enable rotation of first roller 40 within first aperture 50. The second aperture 70 is positioned proximate the second end 22 of elongate body 20. The second roller 58 is received within the second aperture 70 of the elongate frame 20 to enable rotation of second roller 58 within the second aperture 70. The third aperture 70 is positioned between the first aperture 50 and the second aperture 70 formed in the elongate frame 20. The cutting wheel 75 is received within the third aperture 87 of the elongate frame 20 to enable rotation of the cutting wheel 75 within the third aperture 87. The side wheels 90, 106 prevent the pipe to be split 12 from deforming as the elongate frame 20 is pulled along the longitudinal axis of the pipe to be split 12 by pulling means (not shown) known in the art. Other structures may be used to prevent the pipe from deforming. For example, bosses 101 extending laterally from the first and second sides of the elongate frame engage the interior surface of the pipe as it is deformed inwardly during the passage of the elongate frame to prevent deformation to the extent that the cutting wheel does not fully cuttably engage the pipe. However, since such bosses 101 frictionally engage the interior surface of 12 thereby consuming energy used to pull the device, they are less preferred. In general, as the thickness of the pipe to be split 12 increases such as at a coupling or the like, the tendency for the pipe to deform by elongation in the plane of the cutting wheel 75 is inhibited by side wheels 90, 106. Thus, inhibiting the deformation of the pipe 12 by side wheels 90,106 enables the cutting wheel 75 to cut through the coupling. That is, the side wheels 90,106 prevent the pipe to be split 12 from deforming to the extent that the cutting wheel 75 fails to cuttably engage the third portion 15 (FIG. 7) of the pipe to be split 12 as the third portion 15 is deformed and out of reach of the cutting edge 78 of the cutting wheel 75 thereby preventing the cutting through of the pipe to be split 12 by the cutting wheel 75.

Figure 3:
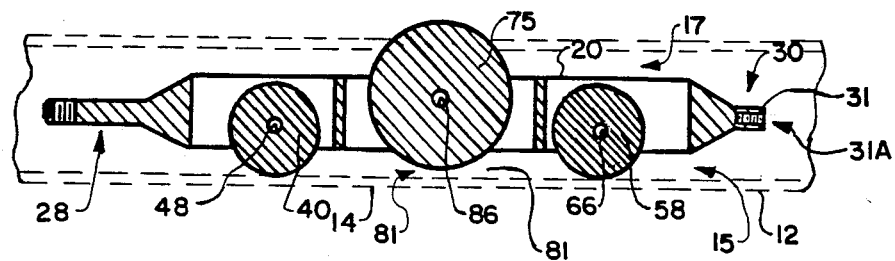
FIG. 3 is a sectional view taken along line 3—3 of FIG. 2.

FIG. 3 is a sectional view taken along 3—3 of FIG. 2, absent first axle 42, second axle 60 and third axle 79. Cutting wheel 75 is spaced apart 81 from the lower portion 14 of the pipe to be split 12. The first roller 40 and second roller 58 rotatably engage the lower portion 14 of the pipe to be split 12 and ensure the spaced apart relationship between the cutting wheel 75 and the lower portion 14 of the pipe to be split 12. The first roller 40 further includes a first axle bore 48 formed in the center of first roller 40. The first axle bore 48 receives the first axle 42 to enable rotation of the first roller 40 relative to the axle 42. In a like manner, second roller 58 includes a second axle bore 66 and cutting wheel 75 further includes a third axle bore 86 formed in their respective centers to enable rotation about their respective axles.

Figure 4:
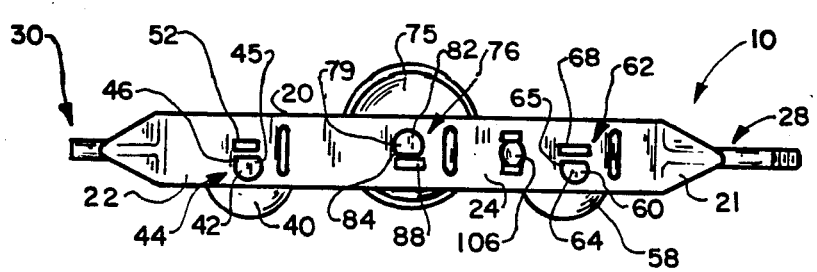
FIG. 4 is a left side view of FIG. 2.

FIG. 4 is a left side view of the apparatus illustrated at FIG. 1. The means for inhibiting the rotation 44 of the first axle 42 comprises a flattened 46 axle head 45 of first axle 42. The flattened 46 axle head 42 cooperates with boss 52 to inhibit rotation of the first axle 42 relative to the rotation of the first roller 40. The means for inhibiting the rotation 62 of the second axle 60 comprises a flattened 65 axle head 64 of the second axle 60. The flattened 65 axle head 64 cooperates with axle head boss 68 to inhibit the rotation of the second axle 60 relative to the second roller 58. The means for inhibiting rotation 76 of the third axle 79 comprises a flattened 84 axle head 82 of the third axle 79. The flattened 84 axle head 82 cooperates with axle head boss 88 to inhibit the rotation of the third axle 79 relative to the cutting wheel 75. The inhibition of rotation of the first, second and third axles ensures that the first roller, second roller and cutting wheel rotate about the fixed axles 42,60 and 79 which remain in a fixed and non rotating position. The rotation of the cutting wheel and rollers about the fixed axles 42,60 and 79 causes rotational wear of the axles while preventing any rotational wear relative to the first axle opening 32, second axle opening 33 and third axle opening 34 of the elongate frame 20. As the first, second and third axles are intended to be removable from elongate frame 20, the axles may be replaced when they are worn and/or the rollers and wheel may be interchanged with different sized rollers and cutting wheel to enable a single sized elongate frame to cut pipes having different sized bores or to enable the replacement of an axle, a cutting wheel or roller, if worn. Preferably, the first and second rollers 48,58 and the cutting wheel 75 freely rotate about axles 42,60 and 79, respectively.

Figure 5:
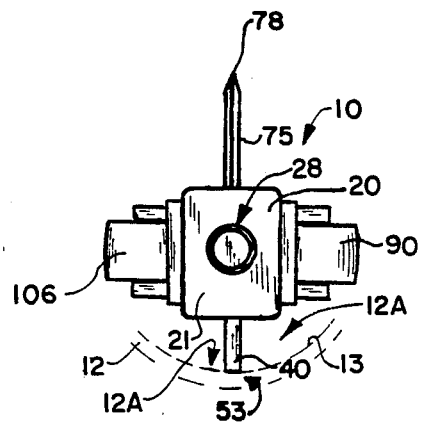
FIG. 5 is a front view of FIG. 2.

FIG. 5 is a front view of the apparatus at FIG. 1. The first end 21 of the elongate frame 20 includes the first coupling means 28. The first roller 40 is rotatably positioned within elongate frame 20 proximate first end 21. The arc 53 of first roller 40 is intended to coincide with the arc 12A of the pipe to be split 12. The cutting edge 78 of cutting wheel 75 is formed by tapering the peripheral dimension of cutting wheel 75 to form a narrow tapered edge 78.

Figure 6:
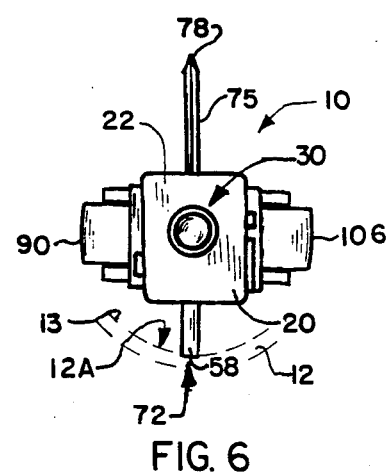
FIG. 6 is a rear view of FIG. 2.

FIG. 6 is a rear view of the apparatus illustrated at FIG. 1. The second coupling means 30 is positioned at the second end 22 of elongate frame 20. In a like manner as first roller 40, the arc 72 of the second roller 58 engages the arc 12A of the bore 13 of the pipe to be split 12.

Figure 7:
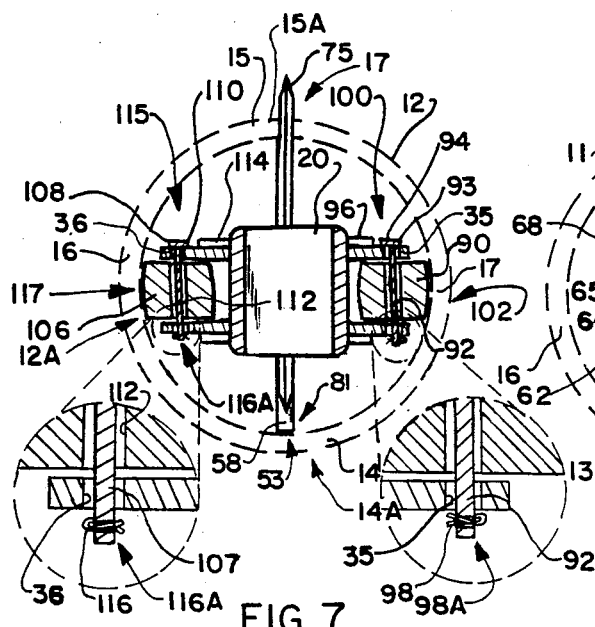
FIG. 7 is a partial sectional view taken along line 7—7 of FIG. 2.

FIG. 7 is a sectional view taken along line 7—7 of FIG. 2. The cutting wheel 75 is spaced apart 81 from the lower portion 14 of the pipe to be split 12 to enable rotation of the cutting wheel 75 without engaging the lower portion 14 of the pipe being split 12. The first roller 40 and second roller 58 rotatably support in use the elongated frame 20 along a first longitudinal path of travel 14A of the pipe to be split 12 when positioned into the bore 13 of the pipe to be split. The cutting wheel 75 cuttably engages the thickness of the pipe wall 11 along a second longitudinal path of travel 15A of the pipe to be split thereby splitting the pipe along the second longitudinal path 15A thereof which is opposite the first longitudinal path of said first and second rollers. Preferably, the first longitudinal path of travel 14A of the first 40 and second 58 rollers is directly opposite the second longitudinal path of travel 15A of the cutting wheel 75. The second roller 58 with arc 53 engages the arc 12A of bore 13 of the pipe to be split 12. In a like manner the first side wheel 90 and second side wheel 106 having arc 102 and 117 respectively, engage the arc 12A of bore 13 of the pipe to be split 12. The first side 23 of elongate frame 20 includes the first side wheel 90 positioned between the first roller 40 and cutting wheel 75 as illustrated at FIG. 2. The elongate frame 20 includes a fourth axle opening 35 and a fifth axle opening 36 formed therein for receiving a fourth axle 92 and fifth axle 107, respectively, to enable the rotation of the first side wheel 90 about the fourth axle 92 and the second side wheel 106 about the fifth axle 107, respectively. The first side wheel 90 further includes a fourth axle bore 95 formed in the center of the first side wheel 90. The fourth axle bore 95 receives the fourth axle 92 to enable rotation of the first side wheel 90 relative to the fourth axle 92. In a like manner, second side wheel 106 includes a fifth axle bore 112 formed in the center of the second side wheel 106 to enable rotation about fifth axle 107. In use, first roller 40 and second roller 58 engage the lower portion 14 of the pipe to be split 12. Whereas the cutting wheel 75 engages the upper portion 15 of the pipe to be split 12 causing the pipe to be split. The first side wheel 90 and second side wheel 106 engage the right side portion 16 and left side portion 17 of the pipe to be split 12, respectively, to prevent the elongation of the pipe 12. The means for inhibiting the rotation 100 of the fourth axle 92 comprises a flattened 94 axle head 93 of the fourth axle 92 which cooperates with boss 96 to inhibit rotation of the fourth axle 92 relative to the rotation of the first side wheel 90. The means for inhibiting rotation 115 of the fifth axle 107 comprises a flattened 110 axle head 108 of the fifth axle 107 which cooperates with axle head boss 114 to inhibit the rotation of the fifth axle 107 relative to the second side wheel 106. The means for inhibiting rotation 44,62,76,110,115 of the first, second, third, fourth and fifth axles, respectively, include other means known in the art such as a cotter key which bridges a corresponding receiving groove in both the elongate frame 20 and axle. The first 42, second 60, third 79, fourth 92 and fifth 107 axles each include a first end and a second end, with the means for inhibiting rotation 44,62,76,110,115, respectively, positioned at each first end of each axle and with a means for retaining 54A,71A,80A,98A,116A each 42,60,79,92,107 axle within the opening formed 32,33,34,35,36 in the elongate frame 20 and positioned at each second end of each axle, respectively. Such means for retaining each axle include a cotter pin 54,71,80,98,116 received into a hole formed at the second end of each axle 42,60,79,92,107, respectively, or a retaining ring received into a receiving groove formed about the periphery of each second end of each axle. The means for inhibiting rotation positioned at the first end of each axle also cooperates with the retaining means positioned at the second end of each axle to retain each axle within the elongate frame 20. In the event that the means for inhibiting rotation of an axle was not used, a retaining means such as a cotter pin would be positioned at the first end of each such axle which together with the axle retaining means at the second end of each axle will ensure that the axle is retained within the elongate frame during use.

Figure 8:
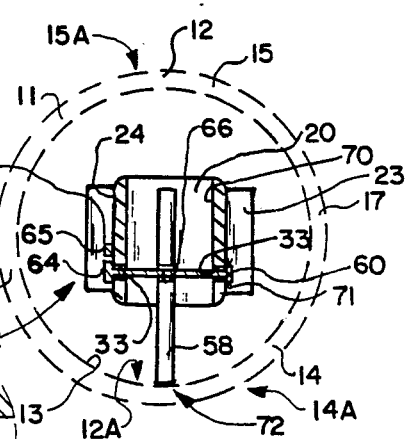
FIG. 8 is a partial sectional view taken along line 8—8 of FIG. 2.

FIG. 8 is a partial sectional view taken along line 8—8 of FIG. 2. The second aperture 70 of elongate frame 20 rotatably receives second roller 58 therein. The arc 72 of the second roller 58 coincides with the arc 12A of the pipe being split 12, in use. The second opening 33 formed in the elongate frame 20 extends from the first side 23 of the elongate frame 20 to the second side 24 of the elongate frame 20 to receive the second axle 60 therethrough. A second axle bore 66 is formed in second roller 58 to receive the second axle 60 therethrough. A means for inhibiting the rotation 62 of the second axle 60 comprises a flattened 65 axle head 64 of the second axle 60. The flattened 65 axle head 64 cooperates with axle head boss 68 to prevent the rotation of axle 60 during the rotation of second roller 58. Axle head bosses 52,68,88,96 and 114 may be a metallic bead welded onto elongate frame 20 which extend toward the respective flattened axle heads thereby interfering in the rotation of the respective axles.

Figure 9:
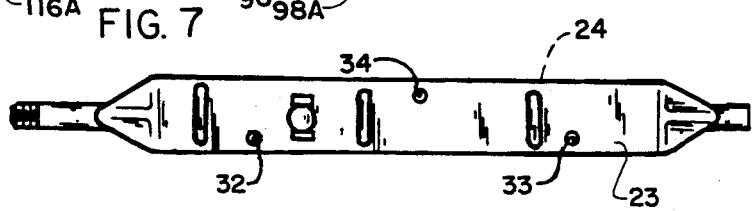
FIG. 9 is a side view of the elongate frame absent the cutting wheel and rollers.

FIG. 9 is a side view of the elongate frame 20 absent the cutting wheel 75 and rollers 40,58. The first opening 32, second opening 33 and third opening 34 each extend from the first side 23 of the elongate frame 20 to the second side 24 of the elongate frame 20 to enable the reception therethrough of first axle 42, second axle 60 and third axle 79, respectively.

The present disclosure includes that contained in the appended claims as well a that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A pipe splitter comprising:
    an elongated frame having a first end and a second end;
    said elongate frame further including a first side and a second side;
    a first roller and a second roller rotatably positioned proximate said first end and said second end of said elongated frame, respectively, to rotatably support said elongated frame along a first longitudinal path of a pipe to be split when positioned into the bore of the pipe to be split;
    a first coupling means securably positioned at said first end of said elongated frame to enable said elongated frame to be pulled along a longitudinal dimension of the pipe;
    a cutting wheel positioned between said first end and said second end of said elongated frame such that said first and second rollers supportingly engage an internal surface of the pipe to be split and said cutting wheel cuttably engages the thickness of the pipe wall along a second longitudinal path of the pipe to be split thereby splitting the pipe along said second longitudinal path thereof which is opposite said first longitudinal path traveled by said first and second rollers within the bore of the pipe to be split; and
    said cutting wheel having a circular dimension being greater than the bore of the pipe and said first and said second rollers are positioned on said elongated frame such that said cutting wheel engages the pipe to be split and forms a single longitudinal split along the second longitudinal path of the pipe.

2. The pipe splitter of claim 1 further including a second coupling means positioned at said second end of said elongated frame to engage with a coupling of a replacement pipe such that said replacement pipe follows said elongated frame being pulled along said longitudinal dimension of the pipe.

3. The pipe splitter of claim 1 wherein each said first end and said second end of said elongate frame further includes a first aperture and a second aperture formed therein, respectively, to receive said first and said second rollers, respectively.

4. The pipe splitter of claim 1 wherein said cutting wheel is rotatably positioned in a third aperture formed in said elongate frame.

5. The pipe splitter of claim 1 wherein said first roller, said second roller and said cutting wheel are positioned in the same plane.

6. The pipe splitter of claim 1 further including a first side wheel and a second side wheel positioned at said first side and said second side of said elongated frame, respectively, such that said first and said second side wheels engage the internal surface of the pipe to be split in a plane perpendicular to a plane of said first and said second rollers to prevent the inward collapsing of the pipe to be split thereby enhancing in use the cutting engagement of a pipe coupling without collapsing the pipe coupling during the passage of said cutting wheel through the thickness of the pipe to be split.

7. The pipe splitter of claim 6 wherein each said first and said second side wheels are each positioned on the elongate frame between said first roller and said cutting wheel proximate said first end of said elongate frame.

8. The pipe splitter comprising:
    an elongated frame having a first end and a second end;
    said elongate frame further including a first side and a second side;
    a first roller and a second roller rotatably positioned proximate said first end and said second end of said elongated frame, respectively, to rotatably support said elongated frame along a first longitudinal path of a pipe to be split when positioned into the bore of the pipe to be split;
    a first coupling means securably positioned at said first end of said elongated frame to enable said elongated frame to be pulled along a longitudinal dimension of the pipe;
    a cutting wheel positioned between said first end and said second end of said elongated frame such that said first and second rollers supportingly engage an internal surface of the pipe to be split and said cutting wheel cuttably engages the thickness of the pipe wall along a second longitudinal path of the pipe to be split thereby splitting the pipe along said second longitudinal path thereof which is opposite said first longitudinal path traveled by said first and second rollers within the bore of the pipe to be split; and
    each said roller including an arced rim such that said arced rim of each said roller coincides with an arc of the inner periphery of the interior lengthwise cylindrical cavity of the pipe to be split.

9. The pipe splitter of claim 6 wherein each said side wheel includes an arced rim such that use the arced rim of each said side wheel coincides with an arc of the inner periphery of the interior lengthwise cylindrical cavity of the pipe to be split.

10. The pipe splitter of claim 3 wherein each side of said elongated frame further includes a first opening and a second opening formed therein and extending through said first side of said elongate frame and said second side of said elongate frame; and
    a first axle and a second axle being supportably received by said first and said second opening in said elongate frame, respectively, for rotatably supporting said first and said second roller wheels received in said first and said second apertures, respectively.

11. The pipe splitter of claim 10 wherein each said first and said second roller wheels further include a first and a second axle bore for receiving said first axle and said second axle, respectively.

12. The pipe splitter of claim 11 further including a means for preventing axle rotation of said first and said second axles relative to said elongated frame wheels thereby enabling said first and said second roller wheels to rotate relative to said first and said second axles.

13. The pipe splitter of claim 4 wherein each side of said elongated frame further includes a third opening formed therein and extending through said first side of said elongate frame and said second side of said elongate frame; and
    a third axle being supportably received by said third opening in said elongate frame for rotatably supporting said elongated frame wheel received in said third aperture.

14. The pipe splitter of claim 13 wherein said cutting wheel further includes an axle bore for receiving said third axle.

15. The pipe splitter of claim 14 further including a means for preventing the axle rotation of said third axle relative to said elongated frame thereby enabling said cutting wheel to rotate relative to said third axle.

16. The pipe splitter of claim 6 wherein said elongate frame further includes a fourth and a fifth opening formed therein and extending through said elongate frame; and
a fourth and a fifth axle being supportably received by said fourth and said fifth opening in said elongate frame, respectively, for rotatably supporting said first side wheel and said second side wheel.

17. The pipe splitter of claim 16 wherein said first side wheel and said second side wheel further include an axle bore for receiving said fourth and said fifth axle; and
a means for preventing axle rotation of said fourth and said fifth axles relative to said elongated frame thereby enabling said first and said second side wheels to rotate relative to said fourth and said fifth axles.

18. A pipe splitter comprising:
an elongated frame having a first end and a second end;
said elongate frame further including a first side and a second side;
a first aperture and a second aperture formed in said elongate frame proximate said first and said second ends of said elongate frame, respectively;
a first roller and a second roller rotatably positioned in said first and said second apertures, respectively, to rotatably support said elongated frame when positioned into the bore of the pipe to be split and being moved along a first longitudinal path of the pipe to be split;
a first coupling means securably positioned at said first end of said elongated frame to enable said elongated frame to be pulled along a longitudinal dimension of the pipe;
a second coupling means positioned at said second end of said elongated frame to enable a coupling of a replacement pipe such that said replacement pipe follows said elongated frame being pulled along said longitudinal dimension of the pipe;
a third aperture formed in said elongate frame between said first aperture and said second aperture of said elongate frame;
a cutting wheel rotatably positioned in said third aperture such that said first and second rollers supportingly engage the internal surface of the pipe to be split and said cutting wheel cuttably engages the thickness of the pipe wall along a second longitudinal path of the pipe to be split thereby splitting the pipe along said second longitudinal path thereof which is opposite said first longitudinal path traveled by said first and second rollers within the bore of the pipe to be split;
said cutting wheel having a circular dimension greater than the bore of the pipe and said first and said second rollers are dimensioned and positioned on said elongated frame such that said cutting wheel engages the pipe to be split and forms a single longitudinal split along the second longitudinal path of the pipe;
each said side of said elongated frame further including a first opening and a second opening formed therein and extending through said first side of said elongate frame and said second side of said elongate frame;
a first axle and a second axle being supportably received by said first and said second opening in said elongate frame, respectively, for rotatably supporting said first and said second roller wheels received in said first and said second apertures, respectively;
each said first and said second roller wheels further include a first and a second axle bore for receiving said first axle and said second axle, respectively;
each said side of said elongated frame further includes a third opening formed therein and extending through said first side of said elongate frame and said second side of said elongate frame;
a third axle being supportably received by said third opening in said elongate frame for rotatably supporting said cutting wheel received in said third aperture;
said cutting wheel further includes an axle bore for receiving said third axle;
a first side wheel and a second side wheel positioned at said first side and said second side of said elongated frame, respectively, such that said first and said second side wheels engage the internal surface of the pipe to be split in a plane perpendicular to a plane of said first and said second rollers to prevent the inward collapsing of the pipe to be split thereby enhancing in use the cutting engagement of a pipe coupling without collapsing the pipe coupling during the passage of said cutting wheel through the thickness of the pipe to be split;
said elongate frame further includes a fourth and a fifth opening formed therein and extending through said elongate frame;
a fourth and a fifth axle being supportably received by said fourth and said fifth opening in said elongate frame, respectively, for rotatably supporting said first side wheel and said second side wheel;
said first side wheel and said second side wheel further include an axle bore for receiving said fourth and said fifth axle; and
a means for preventing axle rotation of said first, second, third, fourth and fifth axles relative to said elongated frame thereby enabling said first roller, said second roller, said cutting wheel and said first and said second side wheels to rotate relative to said first axle, said second axle, said third axle, said fourth axle and said fifth axle, respectively.

19. The pipe splitter of claim 18 wherein said first roller, said second roller and said cutting wheel are positioned in the same plane.

20. The pipe splitter of claim 18 wherein each said first and said second side wheels are each positioned on the elongate frame between said first roller and said cutting wheel proximate said first end of said elongate frame.

* * * * *